E. CHILDS.

LATHE.

No. 11,554. Reissued July 7, 1896.

WITNESSES:

INVENTOR

Eugene Childs,

BY

Wright Brown & Quinby

ATTORNEY.

UNITED STATES PATENT OFFICE.

EUGENE CHILDS, OF REVERE, MASSACHUSETTS, ASSIGNOR, BY DIRECT AND MESNE ASSIGNMENTS, TO THE AUTOMATIC RAPID LATHE COMPANY, OF BOSTON, MASSACHUSETTS.

LATHE.

SPECIFICATION forming part of Reissued Letters Patent No. 11,554, dated July 7, 1896.

Original No. 490,426, dated January 24, 1893. Application for reissue filed February 12, 1896. Serial No. 579,101.

*To all whom it may concern:*

Be it known that I, EUGENE CHILDS, of Revere, in the county of Suffolk and State of Massachusetts, have invented certain new and useful Improvements in Lathes, of which the following is a specification.

This invention relates particularly to the class of machines known as "lathes," "cut-off" machines, and "screw" machines employing a cross-feed or tool-carriage which moves the cutting-tool in a plane at right angles to the central line of the lathe, and particularly to the type of lathe shown in Letters Patent No. 461,401, granted October 13, 1891, to myself and Oscar L. Noble, said Letters Patent showing an improved organization securing approximately uniform rotary speed of the material against the cutting-tool as it passes through the material from its largest to its smallest diameter, or vice versa.

The present invention has for its object to provide certain improvements whereby the speed and power imparted to the spindle are directly proportioned to the distance of the cutting-tool from the axis of the work, and the power transmitting and varying mechanism is enabled to operate with the minimum loss of power due to frictional resistance. To these ends the invention consists in the improvements which I will now proceed to describe and claim.

Figure 1:
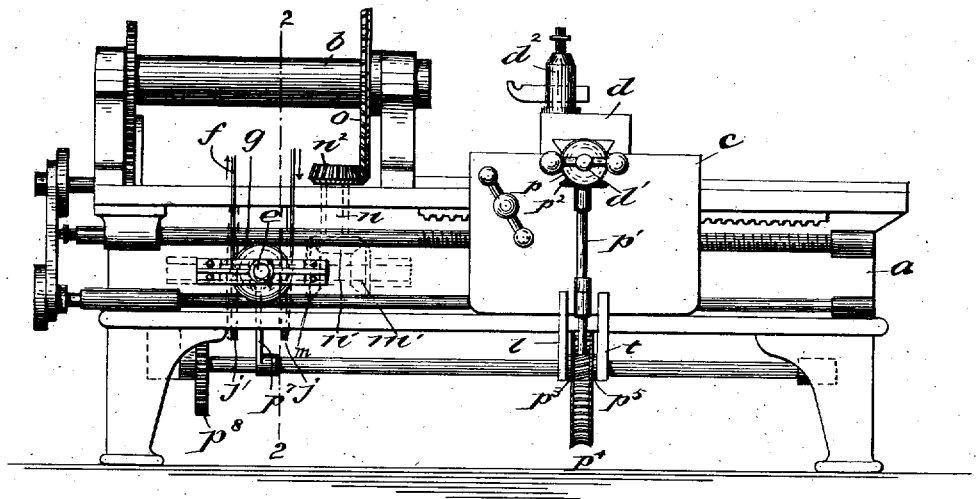
Figure 2:
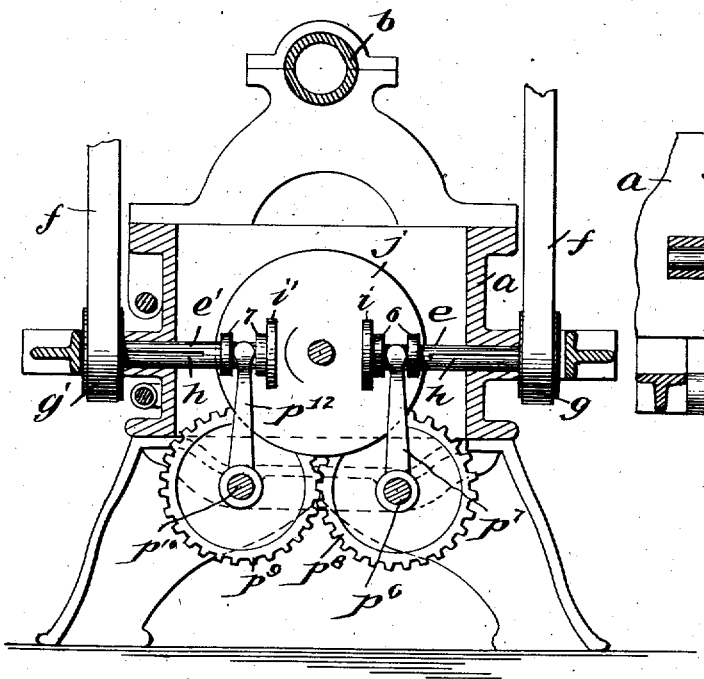
Figure 3:
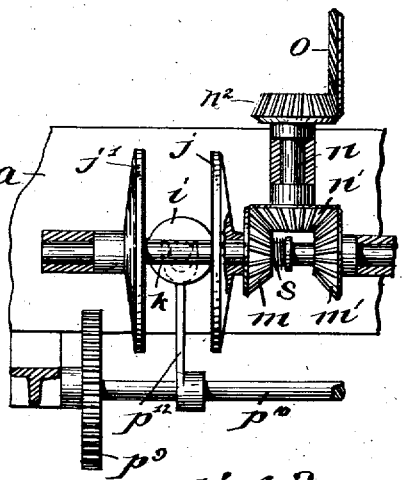

Of the accompanying drawings, forming a part of this specification, Figure 1 represents a side elevation of a lathe embodying my improvements, the tail-stock and other parts of the lathe not essential in illustrating my invention being omitted. Fig. 2 represents a section on line 2 2 of Fig. 1, looking toward the left. Fig. 3 represents a side view and partial section of the mechanism shown in Figs. 1 and 2.

The same letters and numerals of reference indicate the same parts in all the figures.

In the drawings, *a* represents the bed or frame of a lathe. *b* represents the head-stock spindle, mounted to rotate in bearings on said bed, as usual. *c* represents a carriage, which is movable on the bed and supports the cross-feed slide *d*, the latter being operated by the cross-feed screw *d'* and carrying the tool-post $d^2$.

The parts above mentioned are constructed and relatively arranged as usual in machines of this class, and their operation is well known. Hence I do not here describe it in detail.

*e e'* represent shafts, which are journaled in bearings on the bed *a* and are arranged in line with each other and substantially at right angles with the axial line of the spindle *b*. Said shafts are rotated by means of a driving belt or belts *f*, running on pulleys *g g'*, mounted, respectively, on the shafts *e* and *e'*, said pulleys being rotatively engaged with the shafts in such manner as that the shafts are adapted to move lengthwise while being rotated by the pulleys, the connection between the pulleys and shafts being effected in any suitable way, as by splines or feathers on the pulleys engaging grooves *h h* in the shafts.

To the inner ends of the shafts *e e'* are affixed friction-wheels *i i'*, which are located between and are in frictional contact with two friction-disks *j j'*, which are mounted upon a shaft *k*, journaled in fixed bearings on the bed and arranged substantially parallel with the spindle *b*. The disk *j* is mounted loosely upon the shaft *k*, while the disk *j'* is affixed rigidly to said shaft.

The driving-belt *f* is arranged to rotate the pulley *g* and its shaft *e* and friction-wheel *i* in one direction, and the pulley *g'*, its shaft *e'*, and friction-wheel *i'* in the opposite direction, as indicated by the arrows in Fig. 2, said belt, if only one belt is employed, being disposed over a suitable system of pulleys arranged to produce the described result. The friction-wheels *i i'* are located at opposite sides of the shaft *k* and equidistant therefrom, as shown in Fig. 2. Hence their rotation in opposite directions causes the simultaneous rotation of the disks *j j'* in opposite directions. The disk *j* is mounted loosely upon the shaft *k*, and is rigidly affixed to a bevel-gear *m*, said gear and the disk *j* rotating together in the same direction. The disk *j'* is rigidly affixed to the shaft *k*, and rotates with said shaft in the opposite direction.

*m'* represents a bevel-gear, which is affixed to the shaft *k*, and is rotated thereby.

*n* represents a vertical shaft journaled in a fixed bearing on the bed *a* and provided at its lower end with a bevel-gear *n'*, meshing with the gears $m$ $m'$, and at its upper end with a bevel-gear $n^2$, meshing with a bevel-gear $o$, affixed to the head-stock spindle $b$. It will be seen, therefore, that the spindle $b$ is rotated by power imparted from the belt $f$ through the shafts $e$ $e'$, friction-wheels $i$ $i'$, friction-disks $j$ $j'$, gear $m$, shaft $k$, gear $m'$, shaft $n$, and gears $n'$ $n^2$.

As already stated, the shafts $e$ $e'$ are movable longitudinally, their arrangement being such that each shaft, when so moved, approaches or recedes from the shaft $k$. It will be seen, therefore, that the rate of motion imparted to the spindle $b$ may be varied by moving the shafts $e$ $e'$ simultaneously in opposite directions, the speed of the spindle being decreased by moving the shafts $e$ $e'$ outwardly, or away from the shaft $k$, and increased by moving said shafts $e$ $e'$ inwardly, or toward the shaft $k$.

The position of the shafts $e$ $e'$ and friction-wheels $i$ $i'$ relatively to the shaft $k$ is determined by the position of the feed-screw $d'$, said screw being connected with the shafts $e$ $e'$ through suitable intermediate mechanism adapted to move the shafts $e$ $e'$ inwardly toward the shaft $k$ when the feed-screw $d'$ is rotated to carry the cutting-tool toward the axial line of the spindle $b$, so that the speed of the spindle is automatically increased as the tool approaches the center of the work. The said cutting mechanism, as here shown, is as follows:

$p$ represents a bevel-gear affixed to the feed-screw $d'$.

$p'$ represents a vertical shaft journaled in a bearing on the carriage $c$, said shaft having at its upper end a bevel-gear $p^2$, meshing with the bevel-gear $p$, and at its lower end a worm $p^3$, meshing with the worm-gear $p^4$, the hub $p^5$ of which is rotatively engaged with and adapted to move lengthwise upon a shaft $p^6$, which is journaled in fixed bearings on the bed $a$, said hub and shaft being engaged by any suitable means, such as by a spline or feather on one of said parts and a groove in the other part receiving said spline.

$p^7$ represents an arm rigidly affixed to the shaft $p^6$. The upper end of said arm is forked and engaged with two shoulders or collars 6 6 on the shaft $e$.

$p^8$ represents a gear affixed to the shaft $p^6$ and meshing with a gear $p^9$, affixed to a shaft $p^{10}$, which is arranged parallel with the shaft $p^6$, and is also journaled in bearings affixed to the bed $a$. The shaft $p^{10}$ has an arm $p^{12}$, the forked upper end of which is engaged with two collars or shoulders 7 7 on the shaft $e'$.

It will be seen from the foregoing that the rotation of the feed-screw $d'$, which adjusts the tool-carriage $d$ and moves the tool toward and from the center of the work rotated by the spindle $b$, is accompanied by corresponding movements of the friction-wheels $i$ $i'$ toward and from the shaft $k$, the arrangement being such that when the feed-screw is rotated in the direction required to move the tool toward the axis of rotation of the work the friction-wheels $i$ and $i'$ will be moved simultaneously toward the axis of the shaft $k$. When the feed-screw is rotated to move the tool away from the axis of the work, the friction-wheels $i$ $i'$ are moved simultaneously away from the axis of the shaft $k$.

From the foregoing it will be seen that the distance between the cutting-tool and the axis of rotation of the work always corresponds to the distance between the friction-wheels $i$ $i'$ and the axis of the shaft $k$, rotated by said wheels. Hence, when the tool is working at or near the periphery of a comparatively large piece of work, the friction-wheels $i$ $i'$ are considerably removed from the shaft $k$, and as the tool approaches the center of the work said friction-wheels approach the shaft $k$ at a corresponding rate. I thus directly proportion the speed and power imparted to the spindle $b$ to the distance of the cutting-tool from the axis of rotation of the work, the speed being greatest when the tool is at the minimum distance from the axis of the work, and decreasing at a definite rate as the tool recedes from said axis.

In the construction shown in the patent above mentioned the friction-disks are mounted on a shaft arranged at right angles with the spindle, and but one friction-wheel is employed, this being arranged so that when the cutting-tool is at the maximum distance from the axis of the work said friction-wheel is at the minimum distance from the axis of rotation of said disks. Hence, although the speed of the spindle is varied and has the same relation to the position of the tool as in the present case, the power is less when the tool is cutting on a large diameter than when cutting on a small diameter, the power increasing as the tool approaches the axis of the work, this being a disadvantage which my present improvement entirely overcomes. In said former patent the power is first imparted to the friction-disks and from said disks to the friction-wheel, while in the present case the reverse is true, the power being imparted to the friction-wheels and from thence to the friction-disks. By this change I am enabled to greatly simplify the construction of the machine, as will be readily seen.

In the present invention I employ two friction-wheels, instead of one, as shown in said former patent, the said wheels being located at opposite sides of the axis of rotation of the friction-disks. By this duplication and arrangement of the friction-wheels I balance the pressure on the friction-disks $j$ $j'$, making it the same at both sides of the axis of rotation, and prevent that strain on the disks and on the shaft $k$ and its bearings which is caused by the unbalanced pressure of a single friction-wheel on the friction-disks. The loss of power due to frictional resistance in the transmitting mechanism is therefore reduced to the minimum, and the wear of the rotating parts and of their bearings correspondingly reduced.

The loose friction-disk $j$ is shown in Fig. 3 as movable lengthwise upon the shaft $k$ and pressed by a spring $s$ in the direction indicated by the arrow in Fig. 3, so that a suitable frictional connection is at all times maintained between the disks $j\,j'$ and the friction-wheels $i\,i'$, the spring being enabled to act freely in maintaining said pressure by the absence of lateral strain on the friction-disks due to the employment of two friction-wheels. The worm-gear $p^4$ on the shaft $p^3$ is caused to move with the carriage $c$ by means of arms or projections $t\,t$ on the carriage, bearing on opposite ends of the hub $p^5$ of said worm-gear.

In case my invention is applied to a cutting-off machine in which there is no necessity for a carriage movable independently on the lathe-bed, the worm-gear $p^4$ will not necessarily be movable lengthwise upon the shaft $p^6$.

I claim—

1. In a lathe, the combination with the head-stock spindle and cross-feed screw, of two friction-wheels, longitudinally-movable shafts supporting said wheels, means for rotating said wheels simultaneously in opposite directions, two friction disks or plates in contact with said wheels, the wheels being located at opposite sides of the axis of rotation of said disks and movable toward and from said axis, connections between said wheels whereby they are moved simultaneously in opposite directions, connections whereby motion is communicated from the disks to the spindle, and mechanism whereby said wheels are moved toward the axes of the disks at a practically uniform rate of speed as the tool approaches the center of the work.

2. In a lathe, the combination with the head-stock spindle $b$ having gear $o$, and cross-feed screw $d'$ having bevel-gear $p$, of the longitudinally-movable shafts $e\,e'$ in line with each other and at a right angle to spindle $b$ and carrying friction-wheels $i\,i'$, means for rotating said shafts in opposite directions, the friction-disks $j\,j'$ in contact with said wheels $i\,i'$ and geared together and to the bevel-gear $o$ substantially as shown, the shafts $p^6\,p^{10}$ geared together and having arms engaging the shafts $e\,e'$, the worm-gear $p^4$ splined to the shaft $p^6$, and the vertical shaft $p'$ journaled in bearings on the lathe-carriage and having bevel-gear $p^2$ meshing with the gear $p$ and the worm $p^3$ meshing with the gear $p^4$, as set forth.

In witness whereof I have set my hand this 23d day of January, 1896.

EUGENE CHILDS.

Witnesses:
C. F. BROWN,
A. D. HARRISON.